(12) United States Patent
Anglin

(10) Patent No.: US 12,485,391 B2
(45) Date of Patent: Dec. 2, 2025

(54) KNEADING AND MIXING DEVICE FOR IMPACTED CONSUMER FOODSTUFF

(71) Applicant: Don Wade Anglin, Hixson, TN (US)

(72) Inventor: Don Wade Anglin, Hixson, TN (US)

(*) Notice: Subject to any disclaimer, the term of this patent is extended or adjusted under 35 U.S.C. 154(b) by 460 days.

(21) Appl. No.: 18/085,305

(22) Filed: Dec. 20, 2022

(65) Prior Publication Data
US 2024/0198302 A1 Jun. 20, 2024

(51) Int. Cl.
| | | |
|---|---|---|
| B01F 27/115 | (2022.01) | |
| A47J 43/07 | (2006.01) | |
| B01F 33/501 | (2022.01) | |

(52) U.S. Cl.
CPC ....... *B01F 27/1153* (2022.01); *A47J 43/0711* (2013.01); *B01F 33/50115* (2022.01)

(58) Field of Classification Search
CPC .................. B01F 27/1153; B01F 33/50115
USPC .. 366/129, 315–317, 330.1, 330.4, 343, 605
See application file for complete search history.

(56) References Cited

U.S. PATENT DOCUMENTS

| | | | | |
|---|---|---|---|---|
| 2,787,448 | A * | 4/1957 | Fawcett | B01F 27/1153 416/203 |
| 2,896,925 | A * | 7/1959 | Place | B01F 27/1153 416/201 A |
| D195,728 | S * | 7/1963 | Freedman et al. | 416/223 R |
| 5,437,400 | A * | 8/1995 | Loeffler | B44D 3/08 222/570 |
| 5,564,353 | A * | 10/1996 | Wade | A01C 5/04 172/22 |
| 6,955,227 | B1 * | 10/2005 | Motosko | B01F 27/1143 172/111 |

* cited by examiner

*Primary Examiner* — David L Sorkin

(57) ABSTRACT

Kneading and mixing device for manipulation of impacted consumer foodstuff media in combination with a powered hand drill or equivalent. An elongate shaft and a small diameter distally attached disc of formed curvatures keep initially engaged media within its own mechanical sweep until guided to media not yet engaged. A spiraling downward media flow about the shaft to the submerged disc occurs after impaction softening, this flow utilizing media cohesiveness to keep the shaft clear of flinging and clumping media. The disc presents a smooth circle in planform, allowing safe high speed contact to a glass jar wall while presenting a safer rotating consumer device. The consumer is free of concerns for jar height, jar mouth sizes, and custom fitting lids. Eliminated are unreachable jar bottom areas, the difficulty of integrating semi-solid impacted layers, flinging media from the shaft during use, and time consuming cleaning of clumping media.

1 Claim, 3 Drawing Sheets

KNEADING AND MIXING DEVICE FOR IMPACTED CONSUMER FOODSTUFF

CROSS REFERENCE TO RELATED APPLICATIONS

Not Applicable

STATEMENT REGARDING FEDERALLY SPONSORED RESEARCH/DEVELOPMENT

Not Applicable

NAMES OF PARTIES TO A JOINT RESEARCH

Not Applicable

REFERENCE TO SEQUENCE LISTING, TABLE, PROGRAM

Not Applicable

STATEMENT REGARDING PRIOR DISCLOSURES

Not Applicable

BACKGROUND OF THE INVENTION

1. Field of the Invention

The present invention relates generally to stirring and mixing devices and more specifically to powered hand held stirring and mixing devices that address previously blended food substances that have gravity settled its heavier particles into an impacted hard bottom layer in consumer foodstuffs after a significant storage.

2. Description of Related Art

There are numerous devices that have been either offered or marketed that stir seed butters, nut butters, and similar foodstuffs. Examples:
De Feo Application US20140241107A1, Rabii Application US20150196881A1, Rosati Application No. 20050190647, Archon Application No. 2020005501.
De Feo Application US20140241107A1 Natural Peanut Butter Stirrer. Discloses a hand held stirrer. A double tubed rod lever used in place of a spoon or spatula.
Rabii Application No. US20150196881A1. Stirring Implement for Natural Peanut Butter. Discloses a lid mounted auger manipulated by a hand crank.
Rosati Application No. 20050190647. Discloses a single lever peanut butter stirrer using a single metal shaft and a tip mounted metal spade. Intended to be hand manipulated like a spatula.
Archon Application No. 200200055011 A mixer device of sequential looped coils along a length intended to be hand drill powered.
Marketed: Witmers Peanut Butter Mixer. A fitted lid with hand cranked single bent rod system requiring a threaded lid matching the intended jar.
Marketed: Oster. A low powered hand held single shafted mixer fitted with a tip mounted bird cage cake batter end piece. Power suited for thin cream-like substances only. A tip mounted bird-cage type device.

Seen on various social media is a DIY video of a wood constructed peanut butter mixer emulating a wood single spade type wood boring bit for a hand drill.

SUMMARY OF THE INVENTION

Long stored natural seed and nut butters will develop an impacted sediment layer that is difficult to integrate. This layer contains a large portion by weight of what defines the overall consistency. A common consumer issue of fixed in place rotating mixing devices of the arts is the inability to fully manipulate and integrate an impacted layer of seed or nut butters, or reach the wide outer rim areas of jar bottom content. Impacted media, particularly seed and nut butters, can be almost clay or firm dough-like in consistency. A baker's repeated kneading of firm dough, the pushing back onto itself, is the most effective method for integration in such similar media. The manual arts cannot emulate the result of this repeated manipulation of impacted sediment layers in consumer jars. The powered arts mandate slow rotation speeds, and none are capable of duplicating a repeated kneading of an engaged portion of media. The very cohesive nature of seed and nut butters has art mechanical stirring devices significantly encumbered from either clinging, clumping, firm impacted, or hard to engage areas of a container.

The current device presents a means to high speed knead and mix impacted sediment in consumer foodstuff media. Media remains within a mechanically swept area of a small diameter single rotating disc comprised of opposite arching semicircles, these having media engaging scoops formed within these arches. Media is forcibly displaced a short distance downward continuously, only to be forcibly returned upward continuously by a following joined semicircle. Impacted media remains within this mechanical sweep being continuously high speed manipulated repeatedly until the user moves the device to engage elsewhere. This device remains position neutral at all speeds in media, regardless of consistency. In impacted media this device will not attempt to drive itself downward, upward, laterally, shave peelings, or attempt an immediate media flow away from itself. The intended small diameter of the current device lends itself to a user option of initially using a repeated plunging motion in certain impacted seed butters, even of the smallest jar diameters, this done moments before powered rotation. This manual kneading motion coupled with a fast powered rotation is very efficient and convenient in what is considered to be amongst the consumer's most laborious mixing tasks.

After sediment softening in consumer sized jars, an inward and downward spiraling media flow begins along and around the elongate, drawing upper viscous strata down to the submerged disc. A near gapless circular disc perimeter, observable in plan view, allows safe glass jar wall contact at high speed but maintains a smooth lateral aggressive scooping ability. Persons lacking tool handling abilities will not encounter unsafe individual vanes, rods, or paddles. The preferred embodiment is of an injected polymer construct for economy and safety for those unskilled in powered tool use. Metallic constructs of the current device are similarly consumer safe but would lack the lower costs. This current device is devoid of any appendage snagging blades, vanes, rods, or cages. All cubic areas of a jar content can be manipulated, particularly the problematic jar bottom to wall union, this noted in user group comment platforms of the arts. Rotation speeds of the arts are severely limited in highly cohesive clay-like media, or media layers mostly devoid of liquid. Art propeller type, or similarly positive displacing rotating constructs, will potentially create voids or chunks. Art mixing devices cannot repeatedly manipulate, at high speed, a currently engaged portion of impacted media. Any resulting shavings or chunks are difficult to re-engage. Art cage or spade devices configured of a single powered elongate will torque-walk laterally at initial hard layer contact. This results from a then-working portion of a rotating tip not being counter-torqued by its own direct opposite and the free-hand nature of device use. Powered arts do not confine an initially engaged media portion within their mechanical sweep. This containment is necessary to repeatedly manipulate that exact media portion, particularly impacted sediment, at high speed.

Typical seed and nut butter media by nature is very cohesive and self-clinging. The present device ultimately induces a spiraling inward and downward flow along and about the elongate, this cohesiveness eliminating a build-up of media on the shaft. This aids the mixing task, often an up and down motion repeatedly exposing the spinning elongate. Powered arts, all lacking a spiraling downward flow, build up clinging media like cotton candy. Media flinging from rising exposed art shafts, and surface cavitation, are concerns. The current device is not dependent on a custom fitting lid, sweep of a hand cranked fixed pivot stirring rod, standard jar heights, jar mouth sizes, or the jar wall impacting presence of a spade type blade. Current device removal at mixing completion is typically less a cleaning chore than even the art simple hand held lever, the lever having substantial media cling its entire engaging length. The present device's small diameter construct fits through all industry standard small jar openings, and allows high speed rotation to utilize media cohesiveness as an aid rather than an inconvenience. No jar top covering is needed during use given the self clearing of the downward spiraling flow.

DETAILED DESCRIPTION OF THE PREFERRED EMBODIMENT

Figure 1:
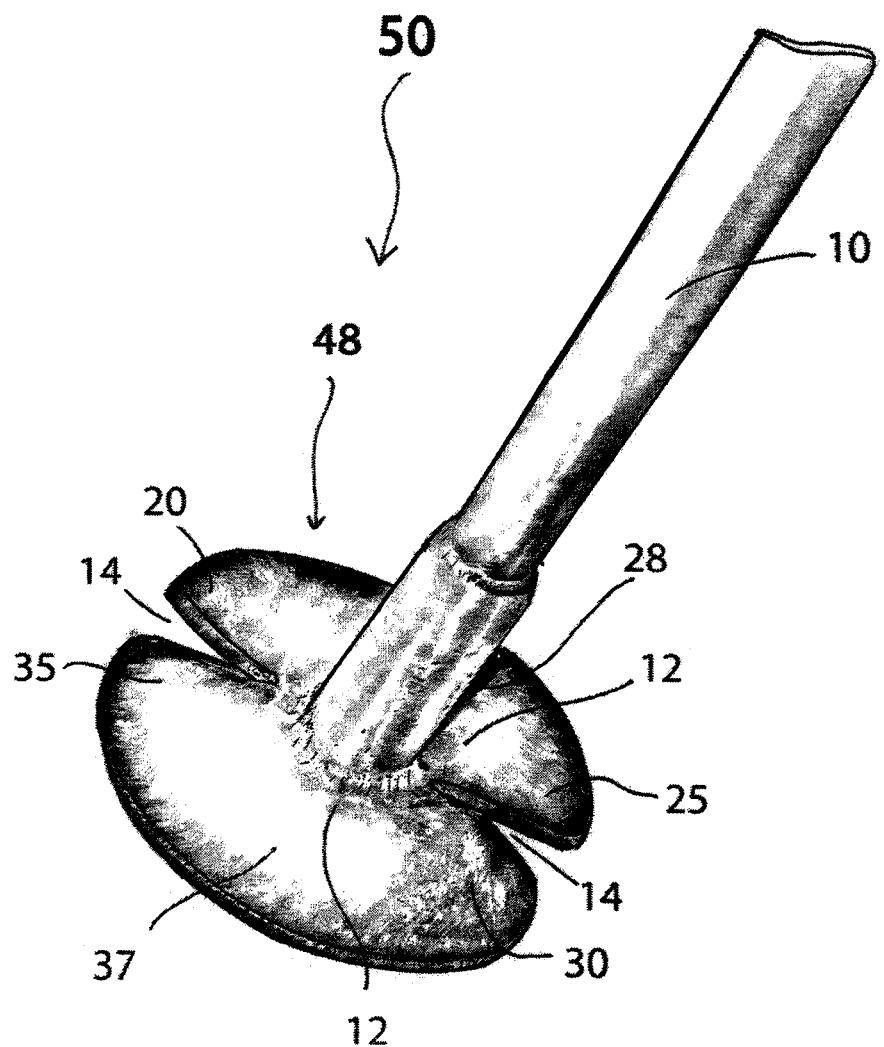
FIG. 1 Perspective view from a downward arching curvature side and positioning of the upward arching curvature opposite it.
Figure 4:
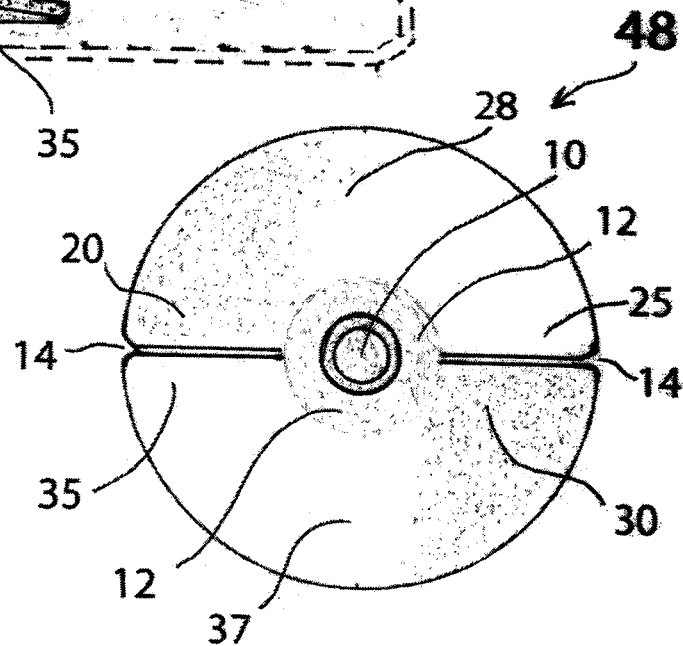
FIG. 4 Plan view of the device disc and elongate.

Turning to the drawings:

Best illustrated in perspective FIG. 1 and plan view FIG. 4, the kneading mixing device 50 includes a single elongate 10 and a distally and perpendicularly mounted disc 48. Disc 48 comprises a downward arching curvature semicircle 37, and an upward arching curvature semicircle 28. Semicircles 37 and 28 are joined collectively, centrally, and on a same plane at central joining area 12. Joining area 12 extends concentrically and radially outward from the center axis of elongate 10 on disc 48 to the beginning of two defining gaps 14, which are separation points for semicircles 37 and 28.

Joining area 12 includes the top, bottom, and thickness of disc 48 in the described area. Defining gaps 14 extend outward from the outer perimeter of joining area 12 to the outer perimeter of device disc 48. Defining gaps 14 are inline, 180 degrees opposing, their alignment passing through the center axis of elongate 10. The center axis of elongate 10 is positioned in the center of joining area 12. The plane of disc 48 is defined by the orientation of joining area 12.

Figure 2:
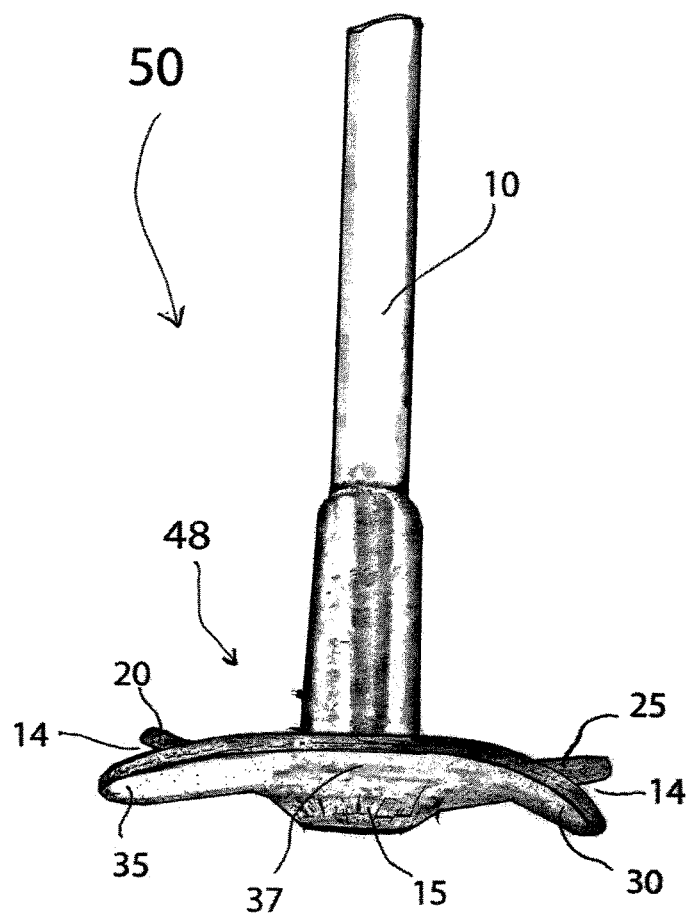
FIG. 2 Elevation view from a downward arching curvature side.

Seen best in FIG. 2, and in consideration of a clockwise rotation as viewed from above for all Figures, semicircle 37 is characterized by a leading downward slope, this downward slope forward portion creating leading scoop 35. Semicircle 37 can be seen in its curvature defining a concave portion at an underside of its arching curvature. One hundred eighty degrees of circular arc in rotation from scoop 35 is trailing lip 30. Trailing lip 30 approximates thirty five degrees of downward angle at a trailing slant. The combination of this downward slope portion, leading scoop 35, and trailing lip 30, form the downward arching curvature 37 of disc 48. The actual angle measurements are approximate, the requirement being that in a preferred configuration trailing lip 30 has a higher curvature than leading scoop 35.

Figure 3:
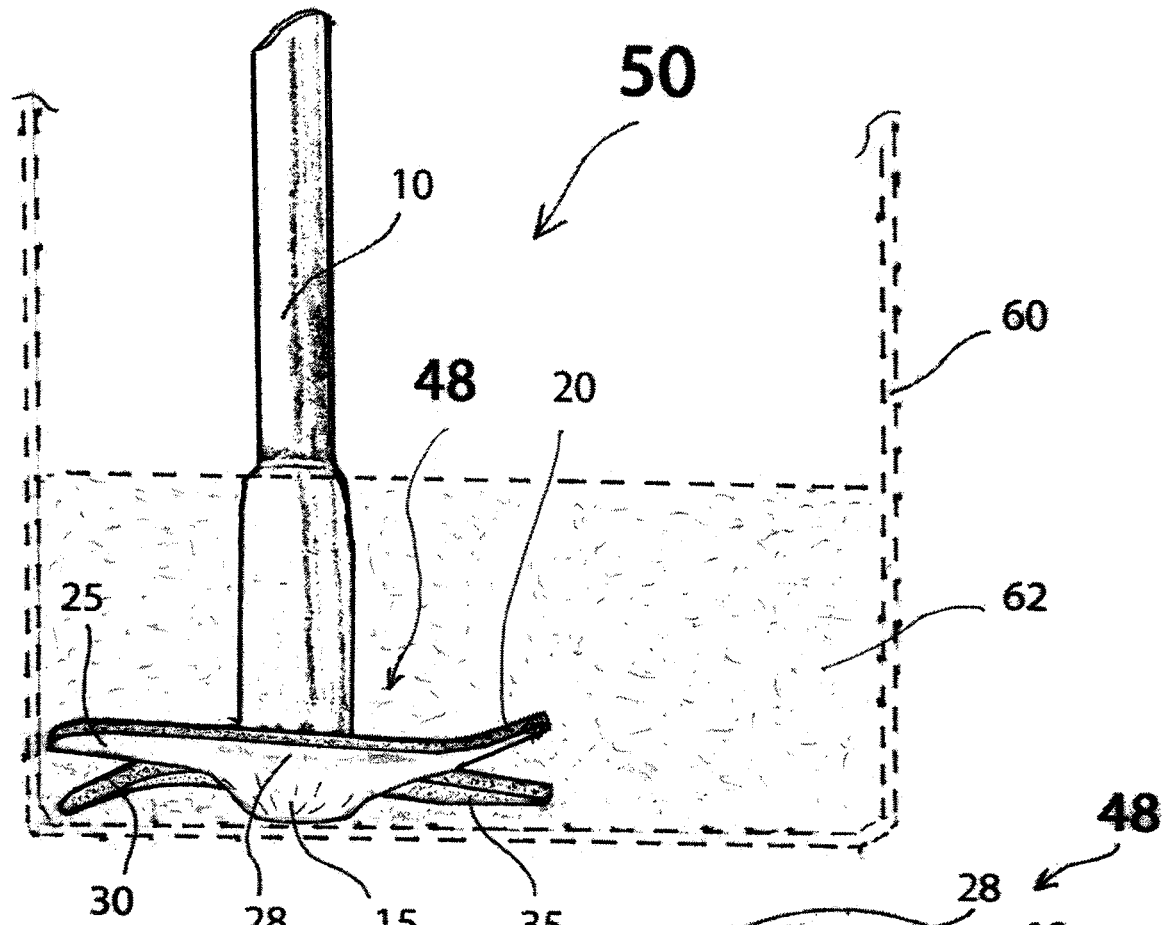
FIG. 3 Elevation view from an upward arching curvature side with a jar section.

Now seen best in FIGS. 1, 3, and 4, semicircle 28 has a leading scoop 25 immediately following trailing lip 30 in rotation. Semicircle 28 is characterized by a leading upward slope, this upward slope forward portion creating leading scoop 25. Best seen in FIG. 3, semicircle 28 can be seen in its curvature as defining a concave portion at an upperside of its arching curvature. One hundred eighty degrees of circular arc in rotation from leading scoop 25 is trailing lip 20. Trailing lip 20 approximates 30 degrees of upward angle. The combination of the upward slope portion, leading scoop 25, and trailing lip 20, form the upward arching curvature semicircle 28 of disc 48. The actual angle measurements are approximate, the requirement being that in a preferred configuration trailing lip 20 has a higher curvature than leading scoop 25. As best seen in the plan view FIG. 4, leading scoop 25, leading scoop 35, trailing lip 30, and trailing lip 20, are constructed to form a fully contiguous circle in planform. Best seen in FIG. 2 is the vertical gapping at defining gap 14, between leading scoop 25 and trailing lip 30, and leading scoop 35 and trailing lip 20, this vertical gapping providing for lateral engagement of impacted media. This vertical gapping maintains a contiguous full circle perimeter in plan view, as seen in FIG. 4.

As shown in FIG. 2 and FIG. 3, centrally positioned bumper standoff 15 is centered around the axis of elongate 10. Bumper standoff 15 defines the centered underside of device disc 48 directly corresponding to joining area 12 above it, area 12 best seen in FIG. 1 and FIG. 4. Bumper standoff 15, now seen in FIG. 2 and FIG. 3, extends downward from the plane of disc 48 a distance slightly greater than the distance trailing lip 30 extends downward beyond the plane of disc 48. Bumper standoff 15 defines the lowest downward extending component of device 50. The plane of disc 48 is best represented by the structure of joining area 12, depicted best in plan view FIG. 4 and FIG. 1.

Seen now in FIG. 3, bumper standoff 15 provides a stand-off for trailing lip 30 and leading scoop 35 to a typical jar 60. The user, after progressing disc 48 through impacted layer 62, can now either repeat the motion as desired, or begin a lateral motion at a desired rotational speed. Centrally located standoff 15 provides for clearance of trailing lip 30 and leading scoop 35 to a bottom of jar 60 at any rotation speed. Bumper standoff 15 will allow device 50 to be rotated at eventual highest speeds after impacted layer 62 integration with the more liquid upper strata. The user will not have concerns of vertical depth and contact of device 50 to the bottom of jar 60. As seen now in plan view FIG. 4, the fully circular perimeter of disc 48 presents a smooth lateral contact to a vertical jar wall. The user can move laterally in any direction, not being concerned with lateral high speed glass jar wall 60 contact. Disc 48, lacking individual impeller-type blades that would otherwise require a shielding ring along a perimeter to prevent harsh jar wall rotational impact, is itself shaped to be a smooth lateral contact to the glass wall of a jar. Standoff 15, seen in FIG. 2 and FIG. 3 additionally serves as structural support for the underside of disc 48 when device 50 is constructed in the preferred one piece polymer injection molding. Standoff 15 is considered common to all anticipated material type construct.

As seen in FIG. 4, the outer perimeter edge of disc 48 lacks an outward facing engaging media scoop, this now presenting a smooth, neutral, lateral dense media engagement. Seen best in side views FIG. 2, 3 and plan view FIG. 4, the leading scoops 25 and 35 present a lateral slicing edge-on engagement along its perimeter that allows a smooth high speed lateral edge contact into hard media. In use, when disc 48 is worked down into an impacted layer, the user can make media contact laterally during high speed rotation without a grabbing, sudden bite into or away from impacted media. The height differences of leading scoops and trailing lips of the two opposing semi circles have no effect on the integrity of a full circled perimeter, this seen best in plan view FIG. 4. Leading scoop 25 and trailing lip 30 present very little planform gap, similarly leading scoop 35 and trailing lip 20.

In a position of use, as seen in FIG. 3, at the encountering of an impacted lower layer of sediment 62, the user begins the kneading manipulation process by pushing device 50 towards the bottom of jar 60. The user can choose to repeat the motion in a vertical manner, enhancing the kneading process by a working of the impaction, or at any moment choose to begin powered rotation. At the encountering of an almost solid impaction, with little or no impacted layer penetration, the user can begin powered rotation without concerns of this device being pulled into the impaction as would be the case with a propeller construction or auger. Such propeller constructions would be unidirectional and will either pull the held powered device downward along the elongate axis, in effect either augering into any media, or will shave slices of media away from the rotational plane, were a device be held back from impacted media. Such slices or shavings are counter productive to media layer integration, this only serving to create numerous shavings of impacted media. Leading scoops 25, 35, trailing lips 20 and 30, are counterpart opposite curvatures. This results in a neutral engagement of media at low to medium speeds which has no imparted flow away from the general plane of disc 48.

A complete disc rotation results in an equal up then down continuous manipulation of impacted media that remains within the mechanical sweep engagement of the two opposite facing curvatures. FIG. 2 and FIG. 3, in consideration of a clockwise rotation, can be seen the containment forms for media that is within a single rotation. Semi circle 37 and semi circle 28 both have leading scoop forward portions pushing media continuously in one direction, along with their respective trailing portions. Semicircle 37 is an opposite curvature of semi circle 28, and within itself each semicircle has a partial reversal of media movement at its own trailing end. This provides for a manipulation area for the introduction of the more liquid media portions, once that degree of media impaction softening has been accomplished. In one complete rotation of device 50, foodstuff media is manipulated a slight distance upward and an equal distance downward, this being done repeatedly at a chosen speed. This cannot be accomplished by art propeller type devices, rotating rod devices, spade type devices, or devices that push media away from a central axis in a constant state.

Until a user moves a rotating disc 48 to another position, firm media within the current disc influence intentionally remains captured. Leading scoops 35 and 25, as seen in FIG. 3, will allow the user to engage impacted media in the hard to reach wall to bottom perimeters, an area considered problematic by those familiar with impacted long stored seed and nut butters being stirred by fixed-pivot manually cranked or powered devices. At subsequent higher speeds after a substantial softening of an impacted layer 62, a slightly greater angle of curvature of trailing lip 30, its position seen best in FIG. 3, will initiate a vertical and circular media flow throughout all layers of media. This vertical and spiraling circular flow down the elongate, combined with typical self clinging media, continuously clears elongate 10 of media as it spins and is raised and lowered in jar 60. The elongate, during this spiraling flow, can be raised and lowered at will during this mixing process. All exposed elongate remains clear of potentially clinging media. This prevents foodstuff flinging from the elongate as it is raised and lowered during a mixing process. This inward and downward flow of media down elongate 10, in combination with the cohesive nature of typical seed and nut media, additionally aids in user device clean up. Historically, any type of art device used in such media this current device addresses, hand held or powered, must be laboriously cleared of clinging media at task completion. A rotating art device that would radially impact and push media away from its own elongate axis, although sufficient for loose media for dry particles, would not allow for the kneading and manipulation of impacted highly self-cohesive media. Such a construct would not create a spiraling downward circular media flow, rather only an outward displacement of any less viscous media. It would be capable of integrating the already more fluid upper strata layers, but would be less effective in addressing impacted sediment at all cubic areas in a container.

In a preferred embodiment, device 50 is manufactured of a single injection molding of polymer. Alternatively an all-metal or combination thereof construct is easily made of a stamped disc 48 that is fastened to the distal end of elongate 10. For those skilled in the art, disc 48 may be secured to elongate 10 by various locking methods, and can also be more permanently attached by welding.

Device disc 48 preferably approximates a diameter of 45 mm, approximately 1.75", to easily accommodate diameters of the smallest commercially available glass jar opening and base. It is not an intention to limit this design to a particular range of diameters as the neutral engagement characteristics lends itself to larger foodstuff containers not commonly encountered by the average consumer. Larger diameter discs can be accommodated to address specific foodstuff material. Efficient maximum rpm use is approximately 1500, well within convenient small sized powered devices, and an included attached powering device can be considered as a unit.

The invention claimed is:
1. A kneading and mixing device for powered manipulation of impacted sediment in consumer foodstuff media, comprising:
  an elongate shaft, having a shaft axis, sized to fit proximately into a powered hand drill or equivalent, and of a length to engage a common consumer jar, a distally, perpendicularly, fixedly, and centrally positioned disc at said elongate shaft axis, said disc having an underside and an upperside, said disc comprising of two semicircles partially joined along their respective diameters on a same plane to form a circle in planform, said partially joined area being in a single central portion of said disc, said joined area not extending to said disk's outer circumference, said non-joined areas being defining gaps that separate said semicircles along their diameters, said joining area having said elongate shaft fixedly and perpendicularly centered, said two semicircles each individually forming an arching curvature extending beyond the plane of said joining area, one said arching curvature extending towards said disc underside, one said arching curvature extending towards said disc upperside, said arching curvatures each having an opposite facing concave portion from the other said arching curvature, one said concave portion facing towards said disc underside, one said concave portion facing said disc upperside, each said arching curvature having a leading edge scoop formed from a bending at said defining gap, this said bending near said joining area, this said bending having a bend line at a right angle to said defining gap, this said bending towards said concave portion of each said arching curvature, each said arching curvature of each said semicircle having a trailing lip formed from a bending at said defining gap, this said bending near said joining area, this said bending having a bend line at a right angle to said defining gap, this said bending towards said concave portion of said arching curvature, said upward arching curvature of said semicircle having said trailing lip of greater curvature than its own more forward positioned said leading edge scoop, said downward arching curvature of said semicircle having said trailing lip of greater curvature than its own more forward positioned said leading edge scoop, said downward arching curvature trailing lip having a higher curvature than said upward arching curvature trailing lip, said underside of said centrally positioned disc includes a bumper standoff centrally located at said shaft axis, said bumper standoff being of a length downward below said disc underside minimizing said downward arching curvature trailing lip contact to a container vessel bottom, said bumper standoff additionally serving to provide structural support to said disc underside at said joining area, said leading edge scoops positioned to guide impacted foodstuff media both into said concave portions and onto said arching curvatures as said disc rotates, said leading edge scoops and said trailing lips extending a distance beyond the plane of said joining area, said disc presenting a gapless circle in planform presenting a smooth contact to a glass jar wall during rotation, said two opposite arching curvatures shaped to impart equal concurrent media manipulation movement when in firm and semi-firm impacted media, one movement being upwards from said upward arching curvature, the other movement being downwards from said downward arching curvature, media manipulation by said disc not imparting media flow away from the plane of said disc at a considered low to medium speeds, keeping engaged impacted foodstuff media within a mechanical swept area of said disc rotation, this non-flow of media allowing said arching curvatures of said disc to repeatedly manipulate that same scooped impacted media repeatedly within a complete rotation, and each rotation following, until said disc is maneuvered to another position to newly engage impacted media not yet manipulated, said higher curvature of said downward arching trailing lip, having said greater curvature than said upward arching trailing lip, having a greater influence on a more liquid foodstuff media than said upward arching curvature trailing lip, this resulting in a spiraling downward foodstuff flow around said elongate shaft to and through said disc, this foodstuff flow causing media displacement to circulate first downward to a container bottom then upward towards a jar vessel top as media is forcedly displaced downward through said disc, said device causing a downward spiraling flow, this flow now utilizing a self-cohesive nature of media to keep said elongate shaft clear of clinging media both during and after task conclusion, said upward and downward arching curvatures, having been joined on the same plane to form a circle defining said disc, said disc having a gapless circumference in planform, this circumference presenting a considered dull and non-sharp edge, this dull and non-sharp edge capable of engaging impacted media laterally with a continuous penetrating slicing sweep during high rotation speeds, said upward and downward curvatures of said joined semicircles, having formed said disc presenting gapless circumference in planform, now capable of direct high speed rotational and lateral contact to a glass jar wall without rotating impact concerns of individual blades, said disc having a circumference presenting no individual protruding rotating portions that can contact persons, said device is made of polymer or metallic material suitable for strength requirements.

* * * * *